United States Patent [19]

Amann et al.

[11] 4,108,838

[45] Aug. 22, 1978

[54] PROCESS FOR THE PRODUCTION OF SOLID THERMOPLASTIC TERPOLYMERIZATE OF TRIOXANE

[75] Inventors: Herbert Amann; Gerhard Morlock, both of Hanau, Fed. Rep. of Germany

[73] Assignee: Deutsche Gold- und Silber-Scheideanstalt Vormals Roessler, Frankfurt am Main, Fed. Rep. of Germany

[21] Appl. No.: 655,358

[22] Filed: Feb. 5, 1976

[30] Foreign Application Priority Data

Feb. 7, 1975 [DE] Fed. Rep. of Germany ....... 2505110

[51] Int. Cl.$^2$ .......................... C08G 2/24; C08G 2/10
[52] U.S. Cl. ..................................... 528/249; 260/823
[58] Field of Search ........................... 260/823, 67 FP

[56] References Cited

U.S. PATENT DOCUMENTS

| 3,256,246 | 6/1966 | Gutweiler et al. | 260/67 FP |
| 3,293,219 | 12/1966 | Gottesman et al. | 260/67 FP |
| 3,453,239 | 7/1969 | Fischer et al. | 260/67 FP |
| 3,457,229 | 7/1969 | Fischer et al. | 260/67 FP |

*Primary Examiner*—Lucille M. Phynes
*Attorney, Agent, or Firm*—Beveridge, DeGrandi, Kline & Lunsford

[57] ABSTRACT

Solid thermoplastic terpolymer of trioxane is prepared by reacting trioxane in the presence of a prepolymer having recurring units consisting essentially of about 87–99 percent by weight of units derived from at least one cyclic formal and about 13–1 percent by weight of units derived from diglycerin diformal.

11 Claims, No Drawings

PROCESS FOR THE PRODUCTION OF SOLID THERMOPLASTIC TERPOLYMERIZATE OF TRIOXANE

BRIEF SUMMARY OF THE INVENTION

This invention relates to a process for the production of solid thermoplastic terpolymers from trioxane by catalytic polymerization.

It is known in the art that thermoplastic polymerizates of trioxane can be produced by catalytic polymerization of a mixture of trioxane, ethylene oxide and pentaerythritol diformal in the presence of borofluoride dibutyl etherate as a catalyst (German published application No. 1,495,267). The branching effect of the pentaerythritol diformal, however, is relatively slight, so that the increase of the molecular weight of the finished terpolymerizate is fairly limited. Because of this only slight branching effect of the pentaerythritol diformal, the structure viscosity of the known terpolymerizate is also only slight. Moreover, mechanical properties of the terpolymers are not entirely satisfactory.

Now, a process for the production of solid thermoplastic terpolymerizates of trioxane has been found by catalytic polymerization of trioxane. The process of this invention comprises polymerizing trioxane in the presence of a prepolymer, the recurring units of which are derived from about 87-99% by weight of at least one cyclic formal and about 13-1% by weight of diglycerin diformal. Particularly suitable are such prepolymers having a viscosity number which lies between 2 and 80 ml/g, preferably between 5 and 50 ml/g, especially between 5 and 30 ml/g.

DETAILED DESCRIPTION

The production of suitable prepolymers is accomplished by cationic copolymerization of a mixture of at least 1 cyclic formal, diglycerin diformal and at least one molecular weight regulator. Particularly suitable cyclic formals are: 1,3-dioxolane, 1,3,5-trioxepane, 1,3-dioxane, 1,3-dioxepane, 1,3-dioxocane and 1,3,6-trioxocane.

Diglycerin diformal can be produced relatively simply and at a good yield from linear diglycerin and formaldehyde (as an aqueous solution, paraformaldehyde or trioxane) in the presence of an acid catalyst. One will obtain as a main product 4,4'-bis-(1,3-dioxolanylmethyl)oxide, which has the following structural formula:

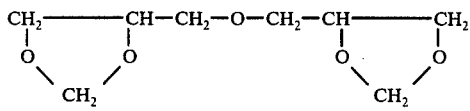

In the case of the use of diglycerin, which consists predominantly of the linear compound, but beside that still contains branched isomers, the reaction with formaldehyde leads to a mixture of isomeric diglycerin diformals, the main component of which represents the compound designated by the formula above. This mixture can be employed with the same success as the pure substance.

The diglycerin diformal is employed for the production of the prepolymers in a quantity of about 1 to about 13% by weight related to the cyclic formal or to the mixture of cyclic formals.

The copolymerization of the cyclic formals with the diglycerin diformal — as has already been mentioned — is carried out in the presence of one or several molecular weight regulators. As a result of the regulation of the molecular weight, excessive branching of the prepolymer will be avoided; as a result, it is possible to dissolve the prepolymer in molten trioxane or distribute the prepolymer colloidally. All substances can be used as molecular weight regulators, of which it is known that they act as chain transfer agents in the case of polymerization of cyclic formals. Particularly suitable are linear formals of the general formula $ROCH_2OR$ in which R signifies an alkyl, cycloalkyl or aralkyl radical with 1 to about 10 carbon atoms, such as dimethyl formal (methylal), diethylformal, di-n-propylformal, diisopropyl formal, di-n-butylformal (butylal), di-sec-butylformal, diisobutylformal, diisopentylformal, di-neopentylformal, di-cyclohexylformal, dibenzylformal and methylbutylformal. The required quantity of molecular weight regulator depends in the first place on its transfer constant, its molecular weight, the amount of diglycerin diformal in the monomer mixture, on the purity of the substances used and on the desired molecular weight and melt index of the trioxane-terpolymer to be produced. Whenever, for example, butylal is employed as molecular weight regulator, approximately 1 to 10% by weight, preferably about 1 to 5% by weight, related to the cyclic formal or mixture of cyclic formals, is necessary. Other linear formals can be employed generally in corresponding molar ratios. Silanes of the general formula $R_nSi(OR^1)_{4-n}$, in which R signifies a hydrogen atom, a straight-chained or branched alkyl or alkenyl radical, a cycloalkyl radical, an aralkyl radical or an aryl radical, $R^1$ signifies a straight-chain or branched alkyl or alkenyl radical, a cycloalkyl radical, an aralkyl radical or an aryl radical and $n$ signifies a whole number from 0 to 2, are also well suited. Naturally, one can also employ combinations of molecular weight regulators.

The copolymerization is initiated by the addition of a cationic catalyst. Particularly suited, because of their great activity, are perchloric acid, esters of the perchloric acid with saturated aliphatic or araliphatic alcohols, and/or mixed anhydrides from perchloric acid and saturated aliphatic or aromatic carboxylic acids. These catalysts will trigger the polymerization even in very low concentrations. The required quantity of catalyst naturally depends upon the purity of the monomers and regulators employed. Whenever carefully purified starting substances are used, then about 1 to 100 ppm of the above-mentioned catalysts, related to te finished mixture, will be sufficient. The polymerization can also be initiated by the use of less active catalysts. It is true that in that case one will need larger quantities. In the case of the use of $BF_3$ etherates, about 40 times the quantity (counted as $BF_3$) is required.

The copolymerization can also be carried out in solution. All substances come into question as solvents which have a sufficient capacity for dissolving the developing copolymer, and moreover are sufficiently stable with regard to the initiators and cations developing during the polymerization; for example, one can employ aliphatic ethers and chlorinated hydrocarbons.

The polymerization temperature can be varied within a wide range. Whenever bulk polymerization is initiated at ambient (room) temperature, then gradually an acceleration of the reaction occurs because of the rise in temperature as a result of the liberated heat of polymerization. In 1 to 2 hours, one will then obtain conversions of 80–90% and more. By the use of higher temperature, the polymerization time can be shortened. In this case, it is advantageous to draw off the polymerization heat and to carry out the process approximately isothermally. This can be accomplished, for example, by reflux cooling whenever the temperature of the reaction mixture exceeds the boiling temperature of the monomer mixture or of the solvents, or else by outside cooling. Good results will generally be achieved in the temperature range between about 20° and 120° C at polymerization times from a few minutes to several hours. The customary containers with stirring mechanisms, but also especially kneading machines in the case of bulk polymerization, can be employed as polymerization vessels. The copolymerization can be carried out on a batch or continuous basis.

After the copolymerization, the prepolymer can be treated secondarily, for example, in order to neutralize the catalyst completely or partially and in order to remove solvents and other volatile components. Whenever the catalyst made of perchloric acid or of one of the above mentioned perchloric acid compounds present in the prepolymer does not lead to a prepolymerization of the trioxane, it will, however, also be possible to mix the reaction product directly with trioxane and then to polymerize it with the latter.

For the production of the terpolymers, the prepolymers are employed in quantities of 0.1 to 10.0% by weight, preferably about 0.5 to about 7.0% by weight, especially about 1.0 to about 4.0% by weight, related to the trioxane used. Beside the prepolymers, one can employ in addition about 0 to about 10.0% by weight of cyclic formals, preferably the ones mentioned by name herein, and furthermore, whenever the molecular weight regulation by the prepolymer is not sufficient, then additional molecular weight regulators can be used. The polymerization will be catalyzed particularly advantageously, as already in the case of the production of the prepolymers, by addition of perchloric acid, esters of the perchloric acid and/or mixed anhydrides from perchloric acid and saturated aliphatic or aromatic carboxylic acids. Generally speaking about 0.1 to about 3.0 ppm, related to the weight of the trioxane, will be sufficient in order to initiate a quick polymerization to high conversions. It is also possible to initiate the polymerization exclusively with the catalyst contained in the prepolymer. The prepolymers are inserted into the developing polyoxymethylene chains by reacetalization. One will obtain branched or slightly cross-linked terpolymers, which are built up of three or more basic units. In the molten state, they are more strongly structurally viscous than unbranched copolymers whenever the share of units derived from diglycerin diformal is higher than about 0.05% by weight, and they can then also be processed by blow-forming.

The branching effect of the prepolymers employed in the process of this invention is considerably greater than that of a quantity of pentaerythritol diformal equimolecular to its content of units derived from diglycerin diformal.

The terpolymers produced in accordance with the process of this invention solidify during cooling more quickly than unbranched copolymers, or those branched only to a slight degree, and they can be processed for that reason particularly favorably even in an injection molding process. Because of their fine crystalline structure, molded bodies made from the terpolymers of this invention have very good mechanical characteristics.

The process according to this invention can be carried out quite generally in all apparatuses working continuously or discontinuously and known for the polymerization of trioxane. At the same time, the polymerization can take place in the presence of known inert solvents for the monomer mixture as a precipitation polymerization; however, polymerization in bulk is preferred.

Also all other conditions of the known polymerization processes for trioxane can be followed without change, especially the customary polymerization temperatures and reaction times.

The polymerizates obtained from this invention can be processed in the customary manner. To these belong all measures which impart the required stability to the polymerizates, especially the working in of stabilizers. Naturally, it will be possible to also add to the terpolymers fillers, lubricants, reinforcing substances, pigments, nucleating agents and additives in the generally customary quantities. Then the polymerizates can be processed according to the processes customary for thermoplastics, for example, by extrusion or injection molding. The terpolymers of this invention, however, are particularly suitable for blow forming. The terpolymerizates formed can be processed well on the customary extruders or injection molding apparatuses whenever their viscosity number, measured at 135° C in dimethylformamide, which contains 2% by weight diphenyl amine, and with a polymer concentration of 0.5 g in 100 ml solution according to DIN 53 726, amounts at a maximum to about 110 (ml/g), or whenever the melt index measured according to DIN 53 735 at 190° C and 21.6 kp load does not drop essentially below a value of 10 g/10 min. (DIN = Deutsche Industrie Norm = German Industrial Standard). Naturally, terpolymerizates with higher molecular weight can still be processed also on the customary extruders or injection molding apparatuses, such as say products with a viscosity number of 140 or an $MFI_{190/21.6}$ of about 1. In that case, however, higher temperatures and higher pressures are needed and one must put up with the fact that the through-put in the case of extrusion regresses, and the poorer flow capacity will only permit the production of relatively thick-walled injection molded parts. By application of special extruders, terpolymers with unusually high molecular weight, the $MFI_{190/21.6}$ of which is far below 1 g/10 min., can still be processed. That naturally is also valid for other thermoplastic forming methods, for example, pressing and sintering.

The process of this invention will be explained further by the following examples in which all parts, percentages, proportions and ratios are by weight unless otherwise indicated. The monomers, molecular weight regulators and the catalyst-solvents employed were carefully purified by distillation. The catalysts, if not stated otherwise, were employed as an approximate 0.01% by weight solution in a mixture comprising 3 parts by volume of ethylene glycol dimethyl ether and 97 parts by volume of 1,2-dichloroethane.

The viscosity number (VZ) in ml/g was determined analogously to DIN 53 726 with the following solutions:

(a) 1.0 g prepolymer in 100 ml toluene solution, measuring temperature 20° C.
(b) 0.5 g trioxane terpolymer in 100 ml dimethyl formamide solution, measuring temperature 135° C. The dimethyl formamide was stabilized with 2% diphenyl amine.

The determination of the melt index in g/10 min (=MFI) was accomplished according to DIN 53 735 at 190° C. From the quotient of the melt index measured at 21.6 kp and 2.16 kp load, the structure viscosity of the polymer melts can be estimated.

COMPARATIVE EXPERIMENT

A mixture of 100 parts trioxane, 2.8 parts 1,3-dioxepane, 0.25 parts pentaerythritol diformal and 0.04 parts butylal were mixed after heating to 70° C while stirring vigorously with 1 part of an 0.01% t-butyl perchlorate solution. In this mixture, the molar proportion of the pentaerythritol diformal of 0.14 mole percent (related to trioxane) was just as high as the molar content of units of the prepolymer, derived from diglycerin diformal, in Example 1 which follows.

Five minutes after the addition of the catalyst, the solid reaction product was comminuted, boiled for 1 hour in an aqueous 0.1% ammonium carbonate solution, and then filtered, washed with water and dried. After that, 100 parts of terpolymer were mixed with 0.4 parts of 1,6-hexanediolbis-3-(3,5-di-t-butyl-4-hydroxy phenyl)-propionate and 0.5 parts N,N'-dimethylol-isophthalic acid diamide, and then this mixture was homogenized for 30 minutes in a heated paddle kneader at about 200° C. The terpolymer had the following characteristics:

VZ : 88 (ml/g)
$MFI_{190/2.16}$ : 1.9 (g/10 min)
$MFI_{190/21.6}$ : 44 (g/10 min)
MFI-quotient$_{21.6:2.16}$ :23

EXAMPLE 1

Production of Branched Prepolymer 0.2 parts of an 0.8% solution of t-butylperchlorate in 1,2-dimethoxyethane were stirred at 24° C into a mixture of 275 parts 1,3-dioxepane, 5 parts butylal and 30 parts diglycerin diformal. The temperature rose without heat supply from the outside in 1 hour to 45° C and then dropped off in another hour to 38° C. Thereupon, the viscous product was diluted with 350 parts of acetone, and after addition of 3 parts of a 0.01% solution of sodium oxide in methanol was stirred for 15 minutes. Subsequently, acetone, methanol, unreacted monomer and volatile reaction products were distilled off in the rotary evaporator. There remained 289 parts of a viscous product having a viscosity number of 16 and a content of 10.3% of units derived from diglycerin diformal. The content of the reaction product of units derived from diglycerin diformal was calculated from gas chromatographic analysis of the distillate.

Copolymerization of the Prepolymer with Trioxane 3.1 parts of prepolymer were dissolved in 100 parts of trioxane and mixed at 70° C, while stirring vigorously, with 1 part of a 0.01% t-butylperchlorate solution. After 5 minutes the solid reaction product was ground and was processed as in the Comparative Experiment and was stabilized. The terpolymer had the following characteristics:

VZ : 90 (ml/g)
$MFI_{190/2.16}$ : 0.8 (g/10 min)
$MFI_{190/21.6}$ : 42 (g/10 min)
MFI-quotient$_{21.6:2.16}$ : 53

EXAMPLE 2

6.2 parts of prepolymer from Example 1 were dissolved in 100 parts of trioxane and mixed at 89° C while stirring vigorously with 0.74 parts of a 0.01% t-butylperchlorate solution. After 5 minutes, the solid reaction product was ground and processed as in the Comparative Experiment and stabilized. The terpolymer had the following characteristics:

VZ : 89 (ml/g)
$MFI_{190/2.16}$ : 0.6 (g/10 min)
$MFI_{190/21.6}$ : 45 (g/10 min)
MFI quotient$_{21.6:2.16}$ : 75

EXAMPLE 3

Production of Branched Prepolymer 0.5 parts of a 0.8% solution of t-butylperchlorate in 1,2-dimethoxyethane were stirred at 50° C into a mixture of 275 parts of freshly distilled 1,3-dioxolane, 5 parts butylal and 30 parts diglycerin diformal. The temperature of the preparation rose in 40 minutes to 93° C and then dropped again slowly. After 150 minutes the viscous product was diluted with 250 parts of acetone, and after the addition of 7.5 parts of a 0.01% solution of sodium oxide in methanol, it was stirred for 15 minutes. Subsequently, acetone, methanol, unreacted monomer and volatile reaction products were distilled off in the rotary evaporator. There remained 248 parts of an initially viscous, but finally waxlike, solid product having a viscosity number of 10 and a content of 12% of units derived from diglycerin diformal. The content of the reaction product of units derived from diglycerin diformal was calculated from gas chromatographic analysis of the distillate.

Copolymerization of the prepolymer with Trioxane 1.5 parts of prepolymer were dissolved in a mixture consisting of 100 parts trioxane and 3.5 parts 1,3-dioxolane, and then reacted at 91° C, while stirring vigorously, with 1.3 parts of a 0.01% t-butylperchlorate solution. After 5 minutes, the solid reaction product was ground, processed as in the Comparative Experiment and stabilized. The terpolymer had the following characteristics:

VZ : 78 (ml/g)
$MFI_{190/2.16}$ : 0.8 (g/10 min)
$MFI_{190/21.6}$ : 75 (g/10 min)
MFI quotient$_{21.6:2.16}$ : 94

What is claimed is:

1. Process for the production of a solid thermoplastic terpolymer of trioxane, said process comprising polymerizing trioxane in the presence of a prepolymer having recurring units consisting essentially of about 87 to about 99 weight percent units derived from at least one cyclic formal and about 13 to about 1 weight percent units derived from diglycerin diformal, and in the presence of a cationic catalyst.

2. Process according to claim 1 wherein said prepolymer has a viscosity number (DIN 53 726) between about 2 and about 80 ml/g.

3. Process according to claim 1 wherein said prepolymer has a viscosity number (DIN 53 726) of about 5 to about 50 ml/g.

4. Process according to claim 1 wherein said prepolymer has a viscosity number (DIN 53 726) of about 5 to about 30 ml/g.

5. Process according to claim 1 wherein said prepolymer is employed in an amount of about 0.1 to about 10.0% by weight, based on the weight of trioxane.

6. Process according to claim 1 wherein said prepolymer is employed in an amount of about 0.5 to about 7.0% by weight, based on the weight of trioxane.

7. Process according to claim 1 wherein said prepolymer is employed in an amount of about 1.0 to about 4.0% by weight, based on the weight of trioxane.

8. Process according to claim 1 wherein said prepolymer comprises the product obtained by reacting:
   (A) about 99 to about 85 weight percent of a cyclic formal selected from the group consisting of 1,3-dioxolane; 1,3,5-trioxepane; 1,3-dioxane; 1,3-dioxepane; 1,3-dioxocane; 1,3,6-trioxocane; and mixtures thereof; and
   (B) about 1 to about 13 weight percent diglycerin diformal;
in the presence of at least one chain transfer agent, and at about 20° to about 120° C for a time sufficient to form said prepolymer.

9. Process according to claim 7 wherein said chain transfer agent is about 1 to about 10% by weight di-n-butylformal.

10. Process according to claim 7 wherein said cyclic formal is 1,3-dioxepane.

11. Process according to claim 7 wherein said cyclic formal is 1,3-dioxolane.

* * * * *